Figure 1:
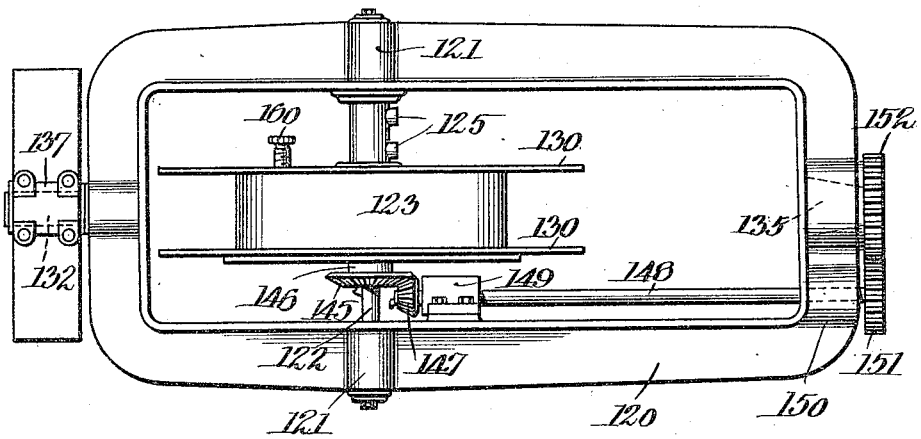

C. T. PRATT.
WINDING OR REELING DEVICE.
APPLICATION FILED FEB. 23, 1911.

1,182,856.  Patented May 9, 1916.

Inventor:
Charles T. Pratt by Martin & Jones
Attys.

UNITED STATES PATENT OFFICE.

CHARLES T. PRATT, OF FRANKFORT, NEW YORK, ASSIGNOR TO THE PRATT CHUCK COMPANY, OF FRANKFORT, NEW YORK.

WINDING OR REELING DEVICE.

1,182,856.   Specification of Letters Patent.   Patented May 9, 1916.

Application filed February 23, 1911. Serial No. 610,314.

*To all whom it may concern:*

Be it known that I, CHARLES T. PRATT, citizen of the United States, residing at Frankfort, in the county of Herkimer and State of New York, have invented certain new and useful Improvements in Winding or Reeling Devices, of which the following is a specification, reference being had therein to the accompanying drawing.

My invention relates to a reeling or winding device and I declare the following to be a full, clear, concise and exact description thereof, sufficient to enable anyone skilled in the art to which it appertains to make and use the same, reference being had to the accompanying drawings in which like reference characters refer to like parts throughout the specification.

The object of my invention is to provide an efficient reeling or winding device or take-up reel upon which may be wound a product such as flexible conduit as it comes from the conduit forming machine (not shown), such product rotating on its own longitudinal axis as it comes from the machine forming the conduit or other product.

The take-up reel is actuated from the main or master shaft of the conduit forming or other machine. The reel itself is provided with novel means for disconnecting the actuating means, such disconnection being found desirable at times when it is convenient to rotate said reel independently of the rotation of the master shaft of the main machine.

Other objects will appear from the specification and claims herein.

Figure 2:
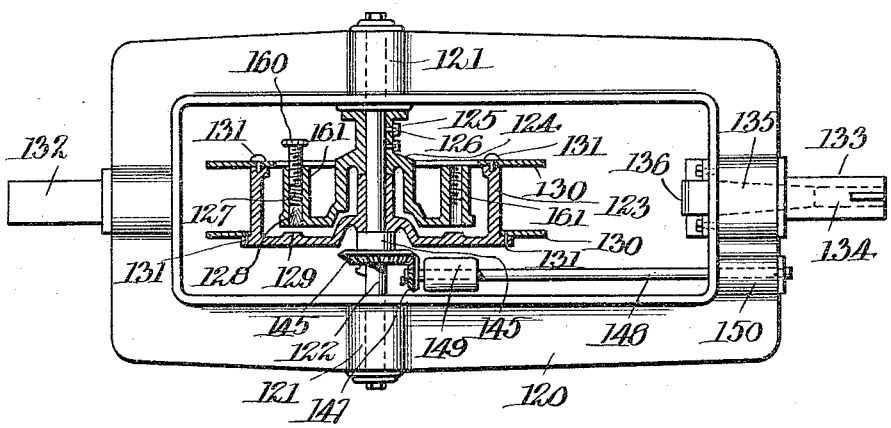

Figure 1 is a plan view of the device. Fig. 2 is a similar view on a slightly reduced scale with the reel proper shown partially in section.

The winding device or take-up reel has a frame 120 having journal boxes 121—121 rotatively supporting shaft 122. Upon shaft 122 is loosely mounted member 123 of the take-up reel, and same is adapted to revolve, when desired, independently of member 124 which is provided with cups 125—125 for the reception of set screws 126—126, whereby to hold member 124 of the reel rigidly to the shaft 122, in order that said member 124 may rotate therewith.

To effect the simultaneous movement or revolution of member 123 with member 124, I employ the novel means of set screws 160, two being sufficient, mounted in proper sleeves 161, whereby their lower ends bear against coiled springs 127, which in turn bear against hard wood plugs 128, adapted to bear against shoulder 129 of member 123 of the reel. The sides of the reel 130—130 are connected by screws or rivets 131 to member 123 thereof.

The opposite end portions of frame 120 are provided with integral journal shafts 132 and 133. The latter has a central passage way 134 with an expanding opening 135 for the proper passage of the finished conduit or other product to the take-up reel. A roller 136 is disposed at the exit port of opening 135 to aid in transmitting the armor.

The take-up reel frame 120 is revolved upon its shaft 132 in journal box 137 and its shaft 133 in a suitable journal by means of said shaft 133 being so operatively connected to the machine making the flexible conduit or other product that said frame 120 rotates in unison with the product to be wound up upon the reeling device.

In order to revolve the take-up reel upon shaft 122, as an axis, I employ bevel gear 145, having integral therewith boss 146, keyed to shaft 122. Said gear 145 is in mesh with bevel gear 147 keyed to spindle 148, supported at one end by journal box 149, secured to frame 120, and at the remote end by a bearing 150 in frame 120. To this end of spindle 148 is keyed spur gear 151 in mesh with pinion 152, loosely mounted on shaft 133 and connected to the main machine by means (not shown) so as to drive the shaft 122 at proper speed.

Set screws 160—160 may be tightly screwed down into sleeves 161—161, in order that the hard wood plugs 128 may be forced into sufficient contact with shoulder 129 of member 123 of the reel, to compel members 123 and 124 thereof to move synchronously. Conversely, if set screws 160 are turned in the reverse direction in their mountings, they will relieve the contact of hard wood plugs 128 upon shoulder 129 of member 123 of the reel, and thus permit member 123 thereof, carrying the armored wire, to revolve freely independently of member 124, set to shaft 122.

Having thus described my invention, what I claim as new and desire to secure by Letters Patent is:

1. In a machine of the character described, the combination of a frame revoluble on its axis, a shaft mounted transverse the axis of said frame and a reel mounted on the said latter shaft, the said reel being composed of parts one secured to the shaft and the other revoluble thereon, and means whereby to apply friction between the two parts of the reel whereby to secure them to operate as a unit.

2. In a machine of the character described, the combination of a frame revoluble on its axis, a shaft mounted transverse the axis of said frame, means for rotating said transverse shaft and a reel mounted on said transverse shaft, said reel being composed of parts, one secured to the shaft and the other revoluble thereon and means to apply friction between the two parts of the reel whereby said reel operates as a unit.

In testimony whereof I have hereunto affixed my signature in the presence of two witnesses.

CHARLES T. PRATT.

Witnesses:
ELEANOR T. DE GIORGI,
T. L. WILDER.

Copies of this patent may be obtained for five cents each, by addressing the "Commissioner of Patents, Washington, D. C."